US009259665B2

(12) United States Patent
Norton et al.

(10) Patent No.: US 9,259,665 B2
(45) Date of Patent: Feb. 16, 2016

(54) LIQUID DISTRIBUTION TROUGH FOR USE IN TOWERS IN SULPHURIC ACID AND CARBON CAPTURE PLANTS

(75) Inventors: Daniel S. Norton, Vancouver (CA); Orlando G. Perez, Richmond (CA); Thomas S. Drackett, North Vancouver (CA); David J. Sterenberg, Vancouver (CA)

(73) Assignee: Chemetics, Inc., Vancouver BC (CA)

( * ) Notice: Subject to any disclaimer, the term of this patent is extended or adjusted under 35 U.S.C. 154(b) by 569 days.

(21) Appl. No.: 13/516,762

(22) PCT Filed: Dec. 9, 2010

(86) PCT No.: PCT/CA2010/001946
§ 371 (c)(1),
(2), (4) Date: Jul. 24, 2012

(87) PCT Pub. No.: WO2011/075817
PCT Pub. Date: Jun. 30, 2011

(65) Prior Publication Data
US 2012/0280411 A1    Nov. 8, 2012

(30) Foreign Application Priority Data

Dec. 23, 2009   (CA) .................................... 2689266

(51) Int. Cl.
*B01D 3/00* (2006.01)
*B01D 53/18* (2006.01)
*B01D 53/26* (2006.01)

(52) U.S. Cl.
CPC .............. *B01D 3/008* (2013.01); *B01D 53/185* (2013.01); *B01D 53/263* (2013.01); *Y02P 70/34* (2015.11)

(58) Field of Classification Search
CPC .... B01D 53/185; B01D 53/263; B01D 3/008; Y02P 70/34

USPC .................................................... 261/160, 74
See application file for complete search history.

(56) References Cited

U.S. PATENT DOCUMENTS 3,006,623 A * 10/1961 Ross ...................... B01D 3/008
                                                         261/110
3,146,609 A *  9/1964 Engalitcheff, Jr. ........ F28D 5/02
                                                         159/13.3

(Continued)

FOREIGN PATENT DOCUMENTS

EP         1316345 A1     6/2003
WO         0059598       10/2000
WO    WO 2005058746 A2 *  6/2005 ............. B01D 3/008

OTHER PUBLICATIONS

PCT Search Report in PCT/CA2010/001946 dated Feb. 18, 2011.

(Continued)

*Primary Examiner* — Amber R Orlando
*Assistant Examiner* — Stephen Hobson
(74) *Attorney, Agent, or Firm* — Manelli Selter PLLC; Edward J. Stemberger

(57) ABSTRACT

A liquid distribution trough contained within a tower for the purpose of mass or thermal exchange between at least a first liquid and a second fluid; the trough having an upper section and a lower section; the lower section for receiving the first liquid; a horizontal dividing member separating the upper section from the lower section and having at least one dividing member portion defining an aperture to allow for passage of the liquid fluid from the lower section to the upper section; a feed conduit means in communication with the lower section to provide feed first liquid flow to the lower section; the lower section having at least one inlet portion defining a liquid inlet in communication with the feed conduit means; and a first baffle adjacent the inlet portion operably impacted by the first liquid flow and to hinder preferential flow along the walls of the trough and the dividing member. The trough and tower are of particular value in a sulphuric acid plant and a carbon dioxide capture plant.

18 Claims, 11 Drawing Sheets

(56) References Cited

U.S. PATENT DOCUMENTS

| | | | | |
|---|---|---|---|---|
| 3,232,590 | A * | 2/1966 | Eckert | B01D 3/20 261/97 |
| 3,360,246 | A * | 12/1967 | Eckert | B01D 3/008 261/97 |
| 3,392,967 | A * | 7/1968 | Eckert | B01D 3/008 261/98 |
| 3,419,251 | A * | 12/1968 | Eckert | B01D 3/008 137/508 |
| 3,591,345 | A * | 7/1971 | Hochman et al. | F28C 3/16 261/96 |
| 4,267,978 | A * | 5/1981 | Manteufel | B01D 3/008 137/561 A |
| 4,272,026 | A * | 6/1981 | Jazlowski | B01D 53/185 239/273 |
| 4,385,010 | A * | 5/1983 | Bosne | F28F 25/04 261/110 |
| 4,432,913 | A * | 2/1984 | Harper | B01D 3/20 239/193 |
| 4,476,069 | A * | 10/1984 | Harper | B01D 3/20 239/193 |
| 4,479,909 | A * | 10/1984 | Streuber | B01D 3/008 239/193 |
| 4,557,877 | A * | 12/1985 | Hofstetter | B01D 3/008 239/450 |
| 4,689,183 | A * | 8/1987 | Helms | B01D 3/008 261/97 |
| 4,816,191 | A * | 3/1989 | Berven | B01D 53/18 261/97 |
| 4,839,108 | A * | 6/1989 | Silvey | B01D 3/008 196/100 |
| 4,846,266 | A * | 7/1989 | Acker | F28F 25/04 165/115 |
| 4,991,646 | A * | 2/1991 | Spears | B60H 1/00471 165/122 |
| 4,994,210 | A * | 2/1991 | Lucero | B01D 53/185 261/110 |
| 5,014,740 | A * | 5/1991 | Cameron | B01D 3/009 137/561 A |
| 5,051,214 | A * | 9/1991 | Chen | B01D 3/008 261/97 |
| 5,061,407 | A * | 10/1991 | Nutter | B01D 53/185 261/96 |
| 5,233,843 | A * | 8/1993 | Clarke | F24F 3/1417 62/271 |
| 5,240,652 | A * | 8/1993 | Taylor | B01D 3/20 261/97 |
| 5,884,658 | A * | 3/1999 | Cameron | B01D 3/008 137/561 A |
| 5,919,405 | A * | 7/1999 | Menon | B01D 3/008 261/97 |
| 6,189,566 | B1 * | 2/2001 | Beutler | B01D 3/008 137/315.01 |
| 6,527,258 | B2 * | 3/2003 | Bartlok | B01D 3/008 261/110 |
| 6,695,008 | B2 * | 2/2004 | Fehr | B01D 1/00 137/315.01 |
| 6,758,463 | B2 | 7/2004 | Zone et al. | |
| 6,966,974 | B1 * | 11/2005 | Ramm-Schmidt | B01D 1/0094 159/13.3 |
| 2002/0041040 | A1 * | 4/2002 | Fischer | B01D 3/008 261/98 |
| 2002/0158350 | A1 * | 10/2002 | Ender | B01D 3/008 261/97 |
| 2003/0011084 | A1 * | 1/2003 | Bosmans | B01D 3/20 261/114.1 |
| 2003/0094709 | A1 * | 5/2003 | Zone | B01D 3/008 261/97 |
| 2008/0245416 | A1 * | 10/2008 | Meier | B01D 3/008 137/9 |
| 2011/0120592 | A1 * | 5/2011 | Gabler | B01D 3/008 141/285 |
| 2014/0166110 | A1 * | 6/2014 | Nieuwoudt | B01D 3/20 137/1 |
| 2014/0284392 | A1 * | 9/2014 | Nascimento | B01D 3/008 239/1 |
| 2014/0374927 | A1 * | 12/2014 | Brown | B01D 3/008 261/110 |
| 2015/0122630 | A1 * | 5/2015 | Lee | B01D 3/008 202/262 |

OTHER PUBLICATIONS

PCT Written Opinion in PCT/CA2010/001946 dated Feb. 18, 2011.
Supplementary European Search Report in EP10838450 dated Feb. 28, 2014.

* cited by examiner (PRIOR ART)

LIQUID DISTRIBUTION TROUGH FOR USE IN TOWERS IN SULPHURIC ACID AND CARBON CAPTURE PLANTS

FIELD OF THE INVENTION

This invention relates to distribution troughs, particularly a plurality and network thereof; to distribution towers comprising said distribution troughs and particularly for use as absorption and drying towers in the sulphuric acid contact process; and carbon dioxide capture.

BACKGROUND OF THE INVENTION

Distributors are used to distribute a liquid throughout an area from a liquid feed source. Specifically, in an absorption tower a liquid is distributed across the top of a packed bed within the tower. A gas flows through the tower in generally counter-current flow to the liquid but it can also flow co-currently. The liquid is used to absorb a chemical out of the gas or a gas is used to strip a volatile component from a liquid. Examples in sulphuric acid production include absorption of sulphur trioxide gas, $SO_3$, or of water vapour into a strong sulphuric acid solution; also the air stripping of sulphur dioxide, $SO_2$, from a sulphuric acid stream. An example in carbon capture and storage processes is the absorption of carbon dioxide, $CO_2$, from gas streams such as atmospheric air and particularly from flue gases produced by carbonaceous fuel burning power generation plants into a solution having preferential absorption for CO2 compared to other gaseous components such as an aqueous solution of alkylamines. A second example in carbon capture and storage processes is desorption of CO2 from said absorbing solution after changes in operating conditions such as temperature and pressure. The efficacy of absorption or desorption is directly related to the uniformity of the liquid distribution.

A distributor may be considered as a single apparatus that may include several distribution stages such as a single inlet source of liquid that is first split into several but generally a few flows (for example, less than, but not necessarily limited to, 10) for a header or manifold system. Liquid is then distributed to a secondary system of several conduits, typically a greater number of conduits than in the first manifold, through one or more feed points in each secondary conduit. Each secondary conduit distributes liquid to many discharge points (e.g. >20); and may include a final stage of discharge means, such as down comer tubes, that direct the many discharge flows on to the packing. Additional stages of increasingly finer distribution can be contemplated, but preferable designs will limit these stages to as few as possible for cost-effectiveness.

There are many design variations for liquid distributors, but there are three distributor types generally recognized as pan or tray, closed conduit or pipe, and trough types. The pan or tray type of distributor has various means such as holes for a uniform liquid distribution but must also provide means such as gas risers for gas flow. The tray or pan type is seldom employed in towers larger than 1.5 meters diameter as they are relatively expensive and generally limited to smaller gas flows.

Pipe distributors are of relatively simple fabrication, generally using readily available piping components. A pipe distributor is typically an inlet pipe through the vessel side wall or vessel top head leading to a central manifold with several radial, horizontal pipe branches; or an inlet pipe into a single central horizontal pipe header through the wall and several perpendicular, horizontal side pipe branches; with a multitude of discharge orifices along the branch pipes. Pipe distributors can occupy a small overall cross-sectional area when designed for pressurized operation with high allowable pressure drop across small discharge orifices. However, disadvantages of pressurized pipe distributors include difficulty obtaining even liquid distribution when the inlet liquid also contains some gas or solids; requiring disassembly for cleaning; and producing fine liquid drops which are carried over with upward-flowing, high velocity gas.

Trough distributors use one or more, troughs to distribute the liquid throughout the tower. The troughs are generally arranged parallel to each other across the tower. The liquid distribution rate out of the troughs is controlled by the number of exit liquid discharge points, the size of the liquid discharge exits, and the surface height above the exits. An initial feed system comprised of a central feed pipe or feed trough is usually fed by means of an inlet pipe through the wall of the column, where the inlet pipe leads to the center of the feed pipe or feed trough or one end of the feed conduit. The initial feed system will split the inlet feed liquid into smaller flows to the distribution troughs and can be located above and perpendicularly across the lower troughs with liquid flow into each lower trough through a single inlet, or through two liquid flows from the opposite sides of the central feed pipe or trough, or through multiple liquid flows supplied by branches from the central feed pipe or feed trough. The trough type of distributor has an advantage over closed conduit type distributors of being open for easy inspection and solids clean out.

There are two main types of trough distributors based upon the kind of liquid exits: weir-type and orifice-type. Weir-type distributors have overflow weirs at or near the top of the trough, and are very sensitive to even small variations in liquid height having a large detrimental impact on uniform distribution. Orifice based distributors have submerged exits in the trough. Submerged orifices have flow rates less sensitive to the height of the liquid above them. However, orifices are more prone to becoming blocked with suspended solids that settle out when compared to weir-type distributors. Both orifices and weirs can be obstructed by large particles.

Distributors may also employ down comers, which are closed conduits, i.e. tubes, which further distribute liquid from discharge points of trough or conduit type distributors across the cross-section of the tower and down to the packing. These are effective in allowing for reduced number of distributor conduits while minimizing liquid entrainment within the gas stream.

In the sulphuric acid industry, pipe and trough distributors were traditionally made from ductile iron because of its ability to form a protective barrier to strong sulphuric acid. However, this barrier can be eroded off if the flow becomes turbulent. This means that the acid has to enter the distribution trough at a low velocity, which is generally achieved by having an overhead piping network to introduce the acid to the trough, splitting the total flow into smaller flows, at several points. Ductile iron troughs or pipes were also designed with large corrosion allowances making them very heavy.

Liquid introduced into packed towers will entrain solids, generally fine particles, from the slow wear of packing and other materials. Larger particles of solids found in the liquid are often small pieces of broken packing; usually occurring during the filling of the tower with the packing. Although means such as strainers or filters are employed to remove solids, such devices are not perfect and, in the sulphuric acid industry, the materials of construction suitable for filter elements have limited life. The solids in the liquid can build up deposits in distributors that cause mal-distribution and a periodic cleaning the equipment is required with subsequent loss of production. However, a higher liquid velocity will retard the formation of deposits by maintaining most solids in suspension to be swept out of the distributor.

Many distributors in sulphuric acid towers are now manufactured out of improved acid resistant materials allowing higher velocities in acid contacted equipment, piping, etc. with reduced size, weight, and corrosion. Cost-effective acid resistant metal alloys are austenitic stainless steels having high silicon content such as SARAMET®, registered to Aker Solutions Canada, Inc. for use in sulphuric acid plants. However, as liquid capacity is increased through a trough distributor, i.e. reducing size with higher velocities, difficulty arises in maintaining a calm liquid surface at a uniform height above each discharge exit; thus different methods of introducing the liquid into the troughs at multiple entrance points have been employed in order to maintain low velocity and minimal disturbance of the liquid surface. In large towers of diameters greater than about 2 meters, several feed conduits are typically employed to provide several liquid entry points into the distribution troughs. However, the additional feed conduits reduce cost-effectiveness and are inconvenient when cleaning is required.

There is, however, a need for an improved distributor, assembly and towers comprising such distributors.

LIST OF PUBLICATIONS

| U.S. Pat. No. | 3,146,609; | 4,479,909; | 5,014,740; |
|---|---|---|---|
| | 3,419,251; | 4,557,877; | 5,884,658; |
| | 4,267,978; | 4,991,646; | 5,919,405; and |
| | 4,272,026; | 4,994,210; | 6,758,463 B2. |

SUMMARY OF THE INVENTION

An objective of the present invention is to provide a trough distributor with a simple and convenient feed conduit means while also providing for an even distribution of liquid.

A further objective of the invention is to provide a trough distributor that will reduce cleaning frequency by preventing sedimentation that will block discharge orifices.

Another objective of the invention is for its use in an improved and cost-effective tower for direct gas-liquid contact in for mass and/or heat transfer processes.

Another further objective of the invention is its use in an improved sulphuric acid process. Additionally, the objectives of the invention include its use in the improvement of other large-scale processes involving adsorption and desorption operations and including carbon capture and sequestration.

The invention relates to a two-section, trough-type liquid distributor for use generally in direct gas-liquid contact devices for mass and/or heat transfer, and more specifically in columns with one or more sections of packing having random or structured packing. The invention is of particular utility in aspects of minimizing the number of feed liquid entry points for individual troughs of the distributor, most preferably reduced to one entry point; and of providing for liquid velocities to keep fine solids suspended in the flow streams throughout the distributor, thus avoiding build-up of finely divided sediments. The invention is of utility for both weir-type and submerged-orifice-type trough distributors with the latter type as a preferred embodiment. The invention may be used for reduced distributor size in many applications, or for high flow capacity, and has particular application in absorption and drying towers in sulphuric acid plants. The invention also has particular application in the distribution of solutions used in absorption and desorption towers in carbon capture and sequestration plants.

Accordingly, in one broad aspect, the invention provides a liquid distribution trough contained within a tower for the purpose of mass or thermal exchange between at least a first liquid and a second fluid;

said trough having an upper section and a lower section;
said lower section for receiving said first liquid;
a horizontal dividing member separating said upper section from said lower section and having at least one dividing member portion defining an aperture to allow for passage of said liquid fluid from said lower section to said upper section;
a feed conduit means in communication with said lower section to provide feed first liquid flow to said lower section;
said lower section having at least one inlet portion defining a liquid inlet in communication with said feed conduit means; and
a first baffle adjacent said inlet portion operably impacted by said first liquid flow and to hinder preferential flow along the walls of said trough and said dividing member.

Preferably, the distributor has a set of at least one second baffle adjacent at least one of said dividing member apertures to direct a portion of said first liquid flow through said dividing member apertures into said upper section of said trough.

Yet more preferably, the distributor has a plurality of deflectors within said upper section, each of said deflectors located adjacent a dividing member aperture and having a portion defining a vertical surface and a portion defining a horizontal surface to effect a reverse essentially horizontal uniform distribution of flow of said first liquid over the lower surface of said upper section of said trough.

The feed conduit means, preferably, comprises a central feed conduit selected from a trough and a pipe.

Preferably, the upper section has portions defining discharge exits selected from weir-type or submerged orifice type by which the first liquid exits the upper section of the trough; and the discharge exits of the distribution troughs are submerged orifice type located on the upper trough section at a common elevation.

Preferably, the discharge exits communicate with downcomers which direct the first liquid flow.

Preferably, the first baffle is also so located ahead of the one aperture as to operably induce turbulence that provides more uniform velocity throughout the cross-section of the lower section of the trough and maintain suspension of most entrained solids.

Preferably, the set of at least one second baffle is also so located as to induce turbulence along the length of the trough that provides more uniform velocity throughout the cross-section of the lower section of the trough and maintain suspension of most entrained solids.

The deflector is, preferably, of a shape having vertical and horizontal surfaces selected from planar and curvilinear faces, wherein more preferably, the vertical face is perpendicular to the longitudinal axis of the distribution trough along which the first fluid flows and the horizontal face is perpendicular to the vertical axis of the trough.

Preferably, the deflectors have angular or curvilinear shaped side-extensions to the faces perpendicular to the longitudinal axis of the distribution trough, which extend at least partly to the side walls of the upper section of the trough.

Preferably, the dividing member comprises a unitary plate having the apertures, or alternatively it comprises a plurality of plates providing the apertures between adjacent plates.

Preferably, each of the second set of baffles is aligned adjacent the downstream back edges of the apertures in the dividing member.

Preferably, the second set of baffles is an attached lower portion or continued lower portion of the deflector assemblies, wherein the lower portion extends through the openings into the lower trough section.

Preferably, the second set of baffles and the deflector assemblies are integrally formed portions of the plates.

Preferably, the distributor has screens to retain large particles in the lower trough section, adjacent the apertures.

The screens are, preferably, sized to retain particles larger than the size of the discharge exits of the troughs; preferably or alternatively sized to retain particles larger than about one fifth the size of the discharge exits of the troughs.

Preferably, the feed conduit means comprises an at least one downcomer for each liquid entrance to said trough.

In a further aspect, the invention provides a network of distribution troughs as hereinabove defined.

In a yet further aspect, the invention provides, a tower for mass and/or heat transfer comprising one or more sections adapted to receive packing and incorporating a distributor or network thereof as hereinabove defined.

Preferably, the absorption tower and/or as the drying tower is of use in the sulphuric acid contact process.

In a yet further aspect, the invention provides, a sulphuric acid plant comprising an absorption tower and/or a drying tower having a distributor or a network of distributors as hereinabove defined.

In one preferred embodiment of the invention, an improved distributor is provided that does not require a network of feed conduits or a feed conduit with branching feed conduits. A single overhead conduit not having any branching feed conduits feeding several distribution troughs is sufficient. Where most prior art trough distributors have multiple liquid entrances, this embodiment of the invention requires only one entrance for each distribution trough. Each trough is divided into a longitudinal open upper section and a longitudinal, essentially enclosed, lower section having a single inlet flow entering therein. Instead of reducing flow velocities with multiple pipes, according to the invention, dispersing the liquid into the lower section, a single entry point is used with energy dissipation and flow deflecting baffle systems that are built into the lower section and into a separating partition plate or plates. There are spaced apertures in the partition plate or plates separating the upper and lower sections, for flow from the lower section into the upper section. Baffles are positioned in the vicinity of the aperture-openings, in the lower section, which baffles redirect a portion of the flow into the upper section. In the upper section a plurality of vertical and horizontal deflector assemblies are also positioned, comprised of vertical and horizontal surfaces, following the openings that re-direct the liquid flow for better distribution. The deflector assemblies cause a turbulent back flow of liquid along the top surface of partitioning plates which prevents solids from accumulating in spaces between exit orifices. The backflow is beneficial towards maintaining a uniform distribution of liquid throughout the upper section. Surprisingly, the additional and backward turbulence induced by the deflectors at the apertures is mostly restrained to the lower region of the upper section and the liquid surface above is made calmer than without the flow direction change. This is achieved by preventing the bulk fluid flow entering the upper section from directly impacting the free surface, and, instead, dissipating its energy to turbulence. The surface calming and improved distribution caused by the deflector, according to the invention, and energy dissipation systems resulting therefrom in the practise of the invention are beneficial to both submerged orifice type and weir type distributors. However, the benefits from sweeping suspended solids in the upper trough section are primarily beneficial to submerged orifice type distributors.

The invention is described in greater detail hereinbelow based upon a submerged orifice type, two-section trough distributor.

Some of the advantages of the invention may be summarized as follows:

Requires only one entrance per trough distributor, which
   Eliminates the need for an overhead pipe distributor network of multiple conduits;
   Reduces tower materials and fabrication labour/time costs; and
   Reduces installation and constructions time and costs.
Design doesn't require tuning of adjusting inlets after installation to balance flow lengthwise along the trough;
Field installation of additional feed conduits are not required;
Reduces commissioning time and costs
Further reduces construction cost
Provides faster start-up for more production profit
Distribution is insensitive to inlet velocity (limited to material limits);
Uses a system of baffles to induce turbulence and redistribute flow throughout the lower section of the trough;
Deflectors control the direction of flow to maintain a uniform distribution along the length of each trough;
Greater flexibility in production rates matching demand;
Less sedimentation issues compared to prior art due to increased liquid velocity and surface shear caused by deflectors in upper portion of the trough.
Longer time for solids build-up reduces frequency of cleaning
More on-line production profit
Further reduces maintenance time/labour costs.

BRIEF DESCRIPTION OF THE DRAWINGS

In order that the invention may be better understood, preferred embodiments will now be described, by way of example only, with reference to the accompanying drawings, wherein:—

DETAILED DESCRIPTION OF PREFERRED EMBODIMENTS

The detailed description below exemplifies use of the invention in facilities that produce sulphuric acid, and in particular to use of the invention in absorption towers of these facilities. While the following detailed description is based on the use of the invention in a sulphuric acid plant, the invention itself is well suited to other processes with absorption towers, particularly with large absorption towers, such as carbon capture processes.

Figure 1:
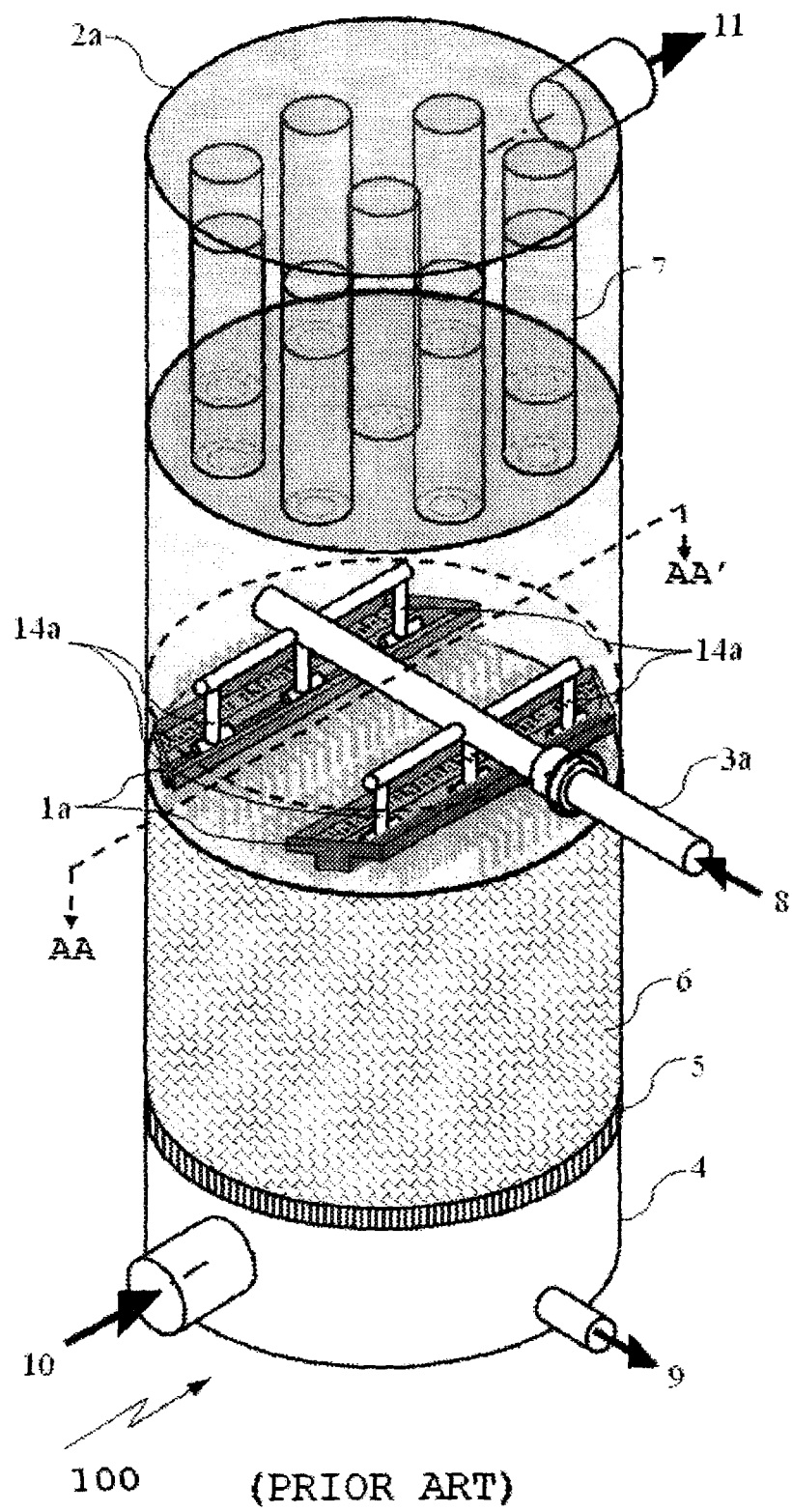
FIG. 1 is an isometric view of a sulphuric acid absorption tower shown generally as 100, according to the prior art.

FIG. 1 shows a packed tower 100 of recent prior art, having distribution trough network 1a and an overhead feed distribution network 3a. Sulphuric acid is distributed into distribution troughs 1a at multiple feed points 14a to reduce its velocity for acceptable erosion/corrosion rates, and also provide for a uniform distribution. Although the recent use of superior corrosion resistant high silicon austenitic stainless steel as the material of construction has reduced the size of distributor troughs 1a due to higher allowed velocities, flow capacity limitations occur in providing a uniform flow distribution and, thus, multiple feed points 14a are still required to reduce velocity for acceptable uniformity of flow distribution. A horizontal cross-section view of tower 100 shown as plane AA-AA' in FIG. 1 is presented in FIG. 3 for greater detail of the prior art distribution troughs 1a and the feed distribution piping network 3a.

Figure 2:
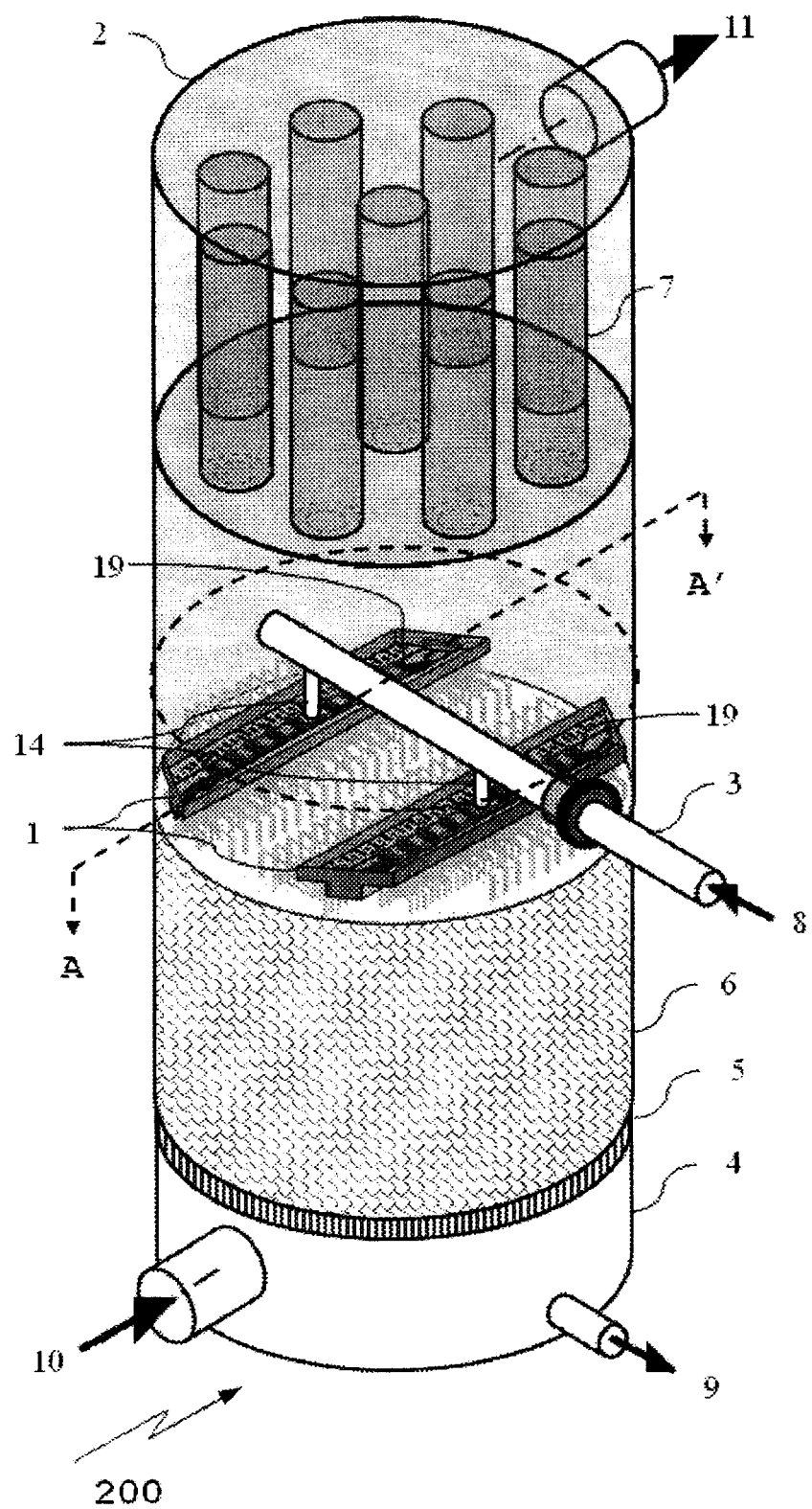
FIG. 2 is an isometric view of sulphuric acid absorption tower shown generally as 200, according to the invention.

Tower 200 shown in FIG. 2 has two liquid distribution troughs 1 according to the invention. Troughs 1 distribute inlet liquid flow 8 uniformly across the top of packing shown as 6 supported by packing support 5. Liquid flows downward and exits tower 200 as the exit liquid flow 9. In counter current tower 200, as shown, inlet $SO_3$-containing gas flow 10 enters tower 200 into vestibule 4. The gas travels upwards through packing support 5 and packing 6 where heat and/or mass transfer occurs between the sulphuric acid and the $SO_3$ containing gas. $SO_3$-depleted gas then passes past the liquid distribution system comprising the simple inlet feed conduit network 3 and improved distribution troughs 1 having single inlets 14 and flow deflectors 19 of use according to the invention. As the $SO_3$ depleted gas flows upward past the liquid distribution system liquid droplets may be entrained and the gas then passes through mist eliminators 7 to remove any liquid carry-over before exiting tower 200 as gas outlet flow 11. Sulphuric acid inlet feed conduit 3 is shown with feed flow 8, split into flows entering through single inlets 14 of each distributor trough 1. A cross-section plan view of the tower, shown as plane A-A' in FIG. 2 is presented in FIG. 4 for greater detail of the improved distribution troughs 1 and the corresponding feed distribution piping network 3.

Figure 3:
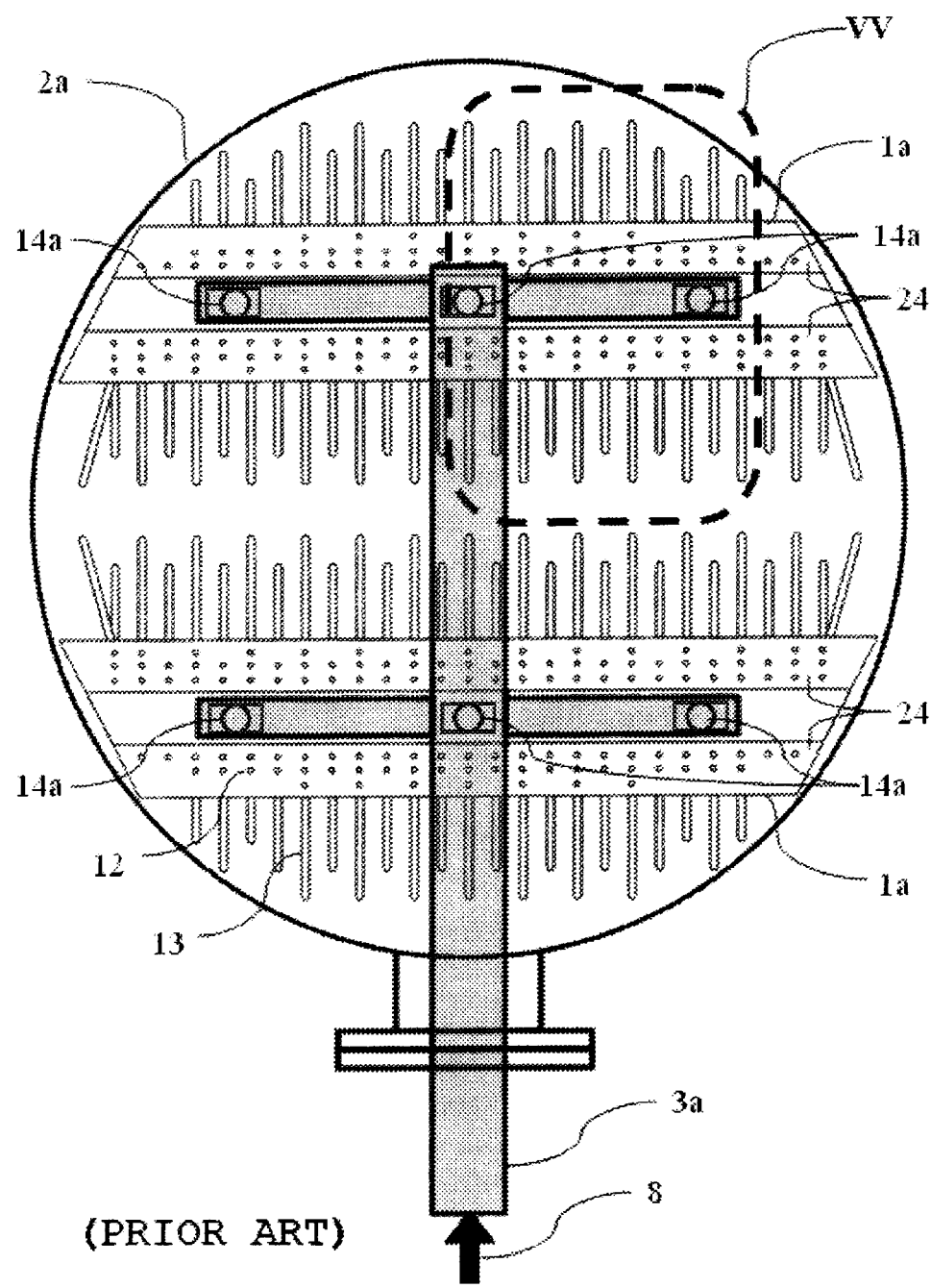
FIG. 3 is a horizontal cross-sectional plan view of the absorption tower of FIG. 1, on the plane AA-AA', according to the prior art.

FIG. 3, shows a tower plan view at cross-section plane AA-AA' of FIG. 1, having two distribution troughs 1a according to the prior art, each having multiple inlets 14a and, on trough side ledges 24, multiple submerged orifices 12, under which downcomer tubes 13 are attached for directing distribution trough exit flows over the entire cross-sectional area and down to packing 6. Feed liquid flow 8 is distributed through the feed distribution piping network 3a to multiple inlets 14a of prior art distribution troughs 1a. As shown, feed distribution piping network 3a comprises a central feed conduit and smaller branching feed conduits. The number of multiple inlets 14a is chosen for distributing smaller inlet flows as the number of inlets 14a is increased to thereby cause lower velocities throughout the length of distribution troughs 1a. Lower velocities throughout the length of prior art distribution troughs 1a were necessary to ensure an even distribution of liquid. In older prior art distribution troughs constructed of ductile iron, lower velocities were also necessary to avoid accelerated wear. More detail for the outlined portion VV in FIG. 3, below feed distribution piping network 3a, is shown in the enlarged view of FIG. 5 and subsequent cross-sectional views of FIGS. 7 and 9.

Figure 4:
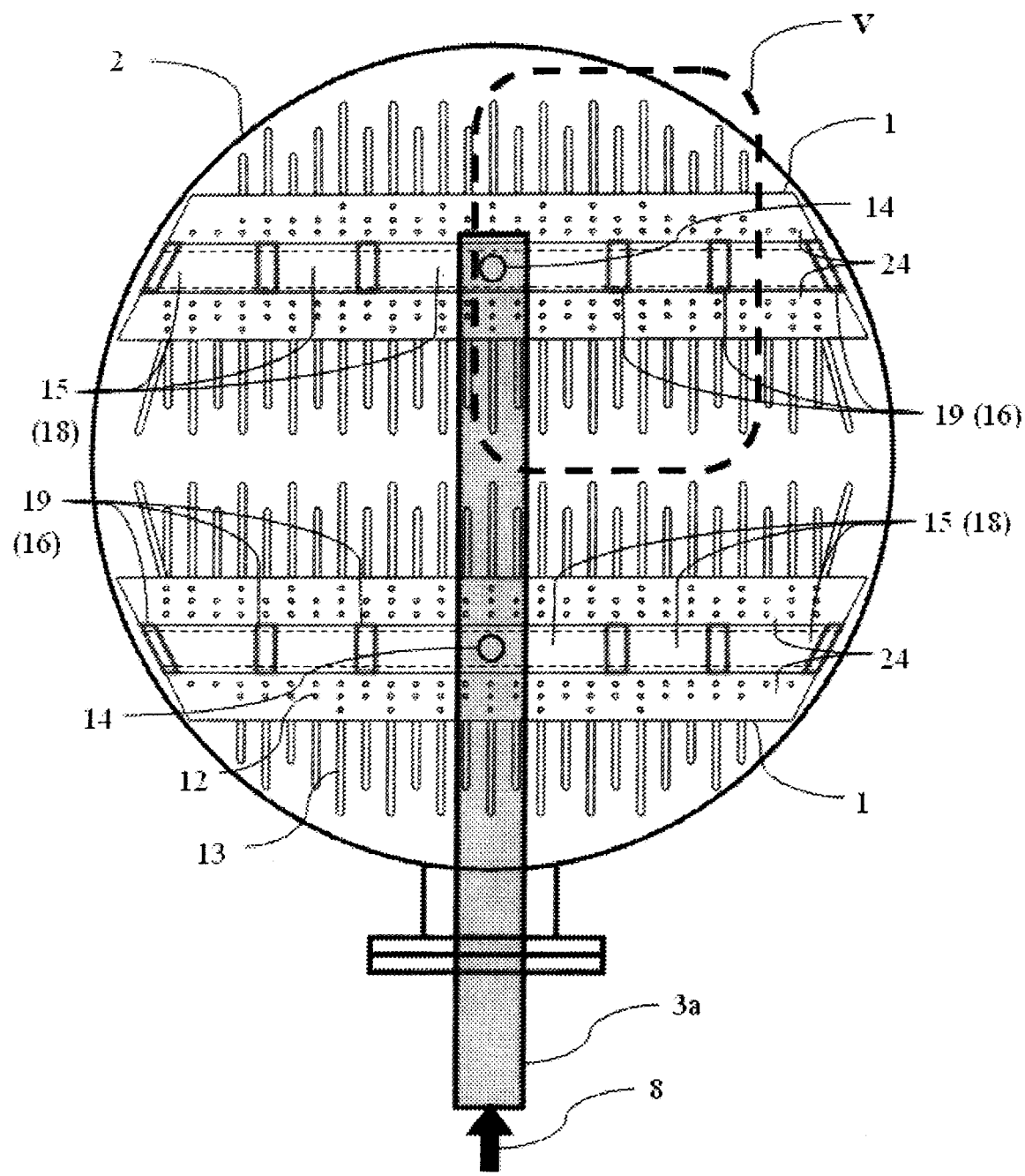
FIG. 4 is a horizontal cross-sectional plan view of the absorption tower of FIG. 2, on the plane A-A', according to the invention.

FIG. 4 shows two distribution troughs 1 according to the invention, each having its own single inlet 14 and, on trough side ledges 24, multiple submerged orifices 12, under which downcomer tubes 13 are attached for directing distribution trough exit flows over the entire cross-sectional area and down to the packing 6. Feed liquid flow 8 is distributed through feed distribution piping network 3 to single inlets 14 of improved distribution troughs 1, according to the invention. As shown, feed distribution piping network 3 comprises only a central feed conduit. Single inlets 14, as compared to the multiple inlets of the prior art, inject higher velocity inlet flow into distribution troughs 1, which includes flow deflectors 19 that are one of the distinguishing features of the invention. Improved distribution trough 1 is shown to include a partitioning plate or plates 15, lying attached to and overlapping the inside edges of ledges 24, and which divide improved distribution trough 1 into an upper open section 17 above ledges 24 and a lower trough section 18 under partitioning plate or plates 15. As better shown in FIGS. 8 and 12, inlet pipe 14 is connected into lower section 18. The inlet flow into lower trough section 18 passes through apertures 16 of partitioning plate/plates 15, which apertures are covered by flow deflectors 19 in this view into upper section 17. More detail for the outlined portion V, below feed distribution piping network 3, is shown in the enlarged view of FIG. 6 and subsequent cross-sectional views of FIGS. 8 and 10.

Figure 5:
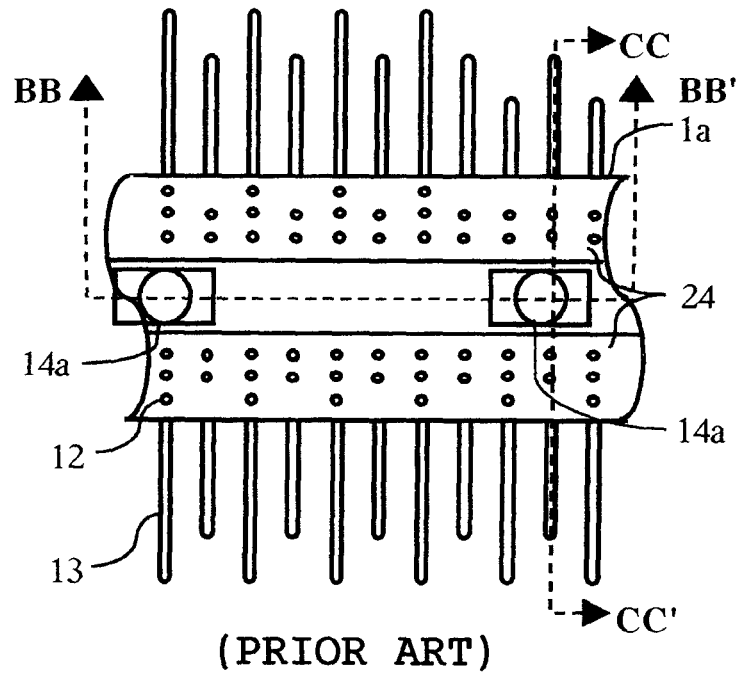
FIG. 5 is an enlarged plan view portion below the feed conduit network 3a, in part, of FIG. 3, denoted as outlined location VV of FIG. 3, according to the prior art.

FIG. 5, enlargement of FIG. 3 plan-view outlined portion VV, shows two of multiple inlets 14a into prior art distribution trough 1a. Along a portion of trough length, longitudinally, the vertical cross-section view BB-BB' as located in FIG. 5, is projected in FIG. 7 for comparison with a similar cross-section side view in distribution trough 1 of the invention. Similarly, across the trough 1 (side-to-side), the vertical cross-section view CC-CC' as located in FIG. 7, is projected in FIG. 9.

Figure 6:
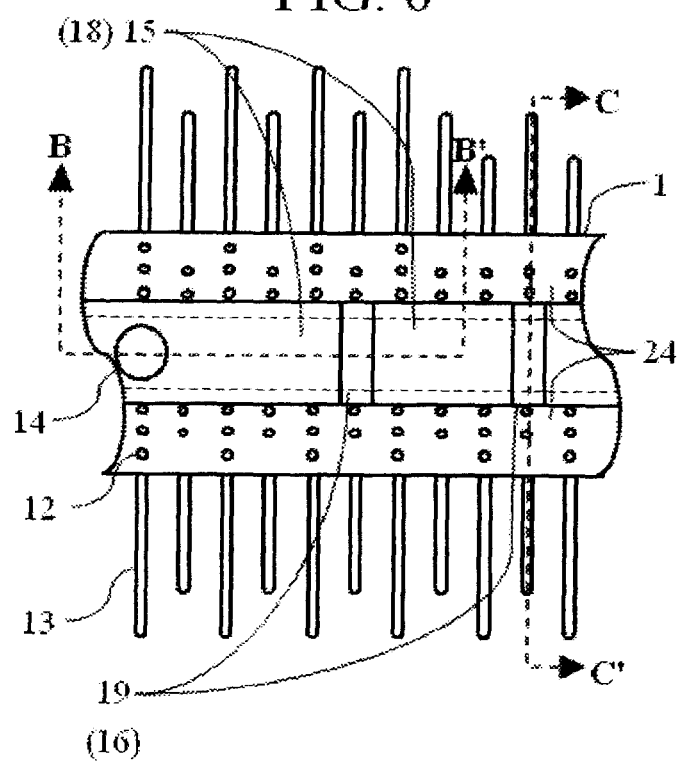
FIG. 6 is an enlarged plan view portion below the feed conduit 3, in part, of FIG. 4, denoted as outlined location V of FIG. 4; according to the invention.

FIG. 6, enlargement of FIG. 4 plan-view outlined portion V, indicates horizontal partition plate/plates 15 that create lower trough section 18, attached onto horizontal side ledges 24 of trough 1 where multiple submerged orifices 12 are located such that all orifices 12 have a common liquid height above. Horizontal partition plates 15 incorporate deflectors 19, a significant feature of the invention, appearing as rectangles from above and which cover apertures 16 in plate/plates 15. Along a portion of trough length, longitudinally, the vertical cross-section view B-B' as located in FIG. 6, is projected in FIG. 8 to best illustrate side views of deflectors 19 and flow patterns due to deflector and baffle features of the invention. Across the trough (side-to-side), the vertical cross-section view C-C' as located in FIG. 6, is projected in FIG. 10 to best illustrate the horizontal ledges 24 and face view of a typical deflector assembly 19.

Figure 7:
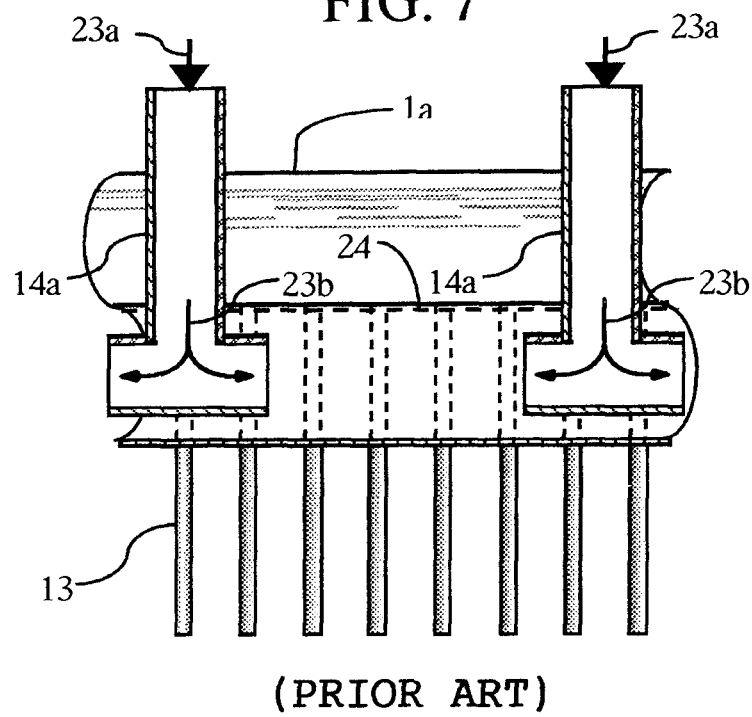
FIG. 7 is a vertical partial cross-section view BB-BB', of FIG. 5, down the longitudinal center of the trough, according to the prior art.
Figure 9:
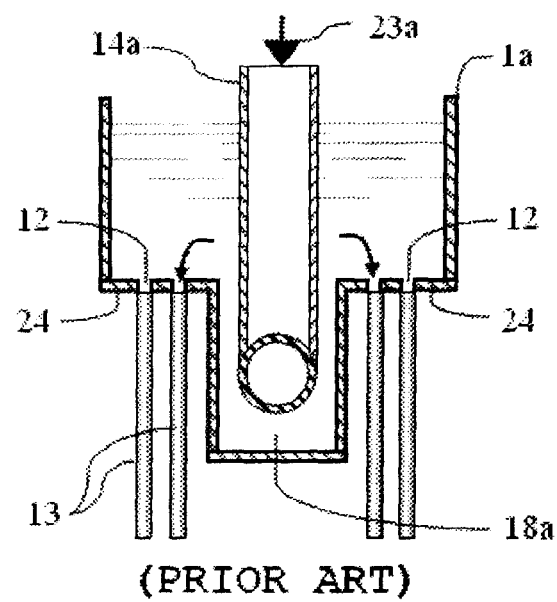
FIG. 9 is a vertical cross-section view CC-CC', of FIG. 5, according to the prior art.

FIG. 7, longitudinal cross-section BB-BB' from FIG. 5, shows a portion of a distribution trough 1a according to the recent prior art, wherein multiple inlets 14a provide divided sulphuric acid inlet flows 23a into the lower region. For clarity, a majority of the downcomers 13 has been removed and the included downcomers are truncated. The included downcomers 13 are shown, behind the trough wall with dashed lines, to extend up to the side horizontal ledge 24 where the downcomers are in fluid communication with submerged orifices (not shown) while submerged orifices 12 are shown in FIG. 9. In this case of recent prior art, the multiplicity of divided inlet flows 23a into trough 1a provide for low velocities suitable for ensuring even distribution of discharge flows along the length of distribution trough 1a.

Figure 8:
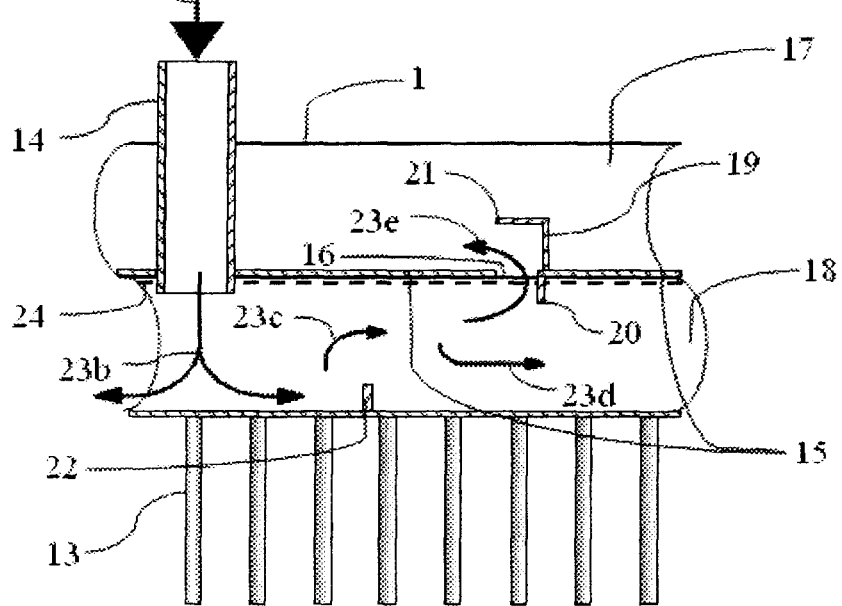
FIG. 8 is a vertical partial cross-section view B-B', of FIG. 6, down the longitudinal center of the trough having geometry and flow patterns, according to the invention.

FIG. 8, longitudinal cross-section B-B' from FIG. 6, shows the two sections of improved distribution trough 1 as upper section 17 and a lower section 18, separated by a horizontal partitioning plate or plates 15, which are attached on the inside edges of horizontal ledges 24. For clarity, the liquid height in upper section 17 is not shown. Also a majority of downcomers 13 has been removed while included downcomers 13 are truncated. Upward extension of the included downcomers to the horizontal side ledge 24 has been not be shown. FIG. 7 shows the extension as dashed lines. Inlet liquid feed distribution conduit 3 (FIG. 2) directs a liquid flow portion 23a, shown in FIG. 8, into each distribution trough 1 by means of a single pipe inlet 14 (FIGS. 2, 4, 6 and 8). The inlet pipe diameter is constrained by the width of lower section 18 of trough 1. There are openings 16 in the horizontal plate or between each plate section 15, through which the fluid flows from lower section 18 into upper section 17. Flow arrows 23 (a through e) show the general direction of sulphuric acid fluid flow. Flow 23e through openings 16 is redirected by deflectors 19, first upwards and then back along the lower surface of upper section 17, opposite to its horizontal inlet direction of travel in the lower section.

In FIG. 8, when a straight pipe is used for single inlet 14, inlet flow 23a impacts the far wall, generally the bottom floor of the trough, flow arrow 23b, and preferentially flows along the floor. An "inlet" baffle or similar obstruction 22 on the floor opposing the inlet flow and positioned close to inlet 14, up to a short distance past first opening 16, redirects the sulphuric acid flow upwards and away from the opposing floor, flow arrow 23c. A minimum of one such baffle 22 on either side of flow inlet 23b is required on the impacted floor. Inlet baffle 22 has been found to be important for inducing turbulence that helps to provide a more uniform velocity profile across the enclosed lower trough section 18. Other profiles for baffle 22 may also be used provided that they disrupt the preferential flow along the wall opposing the inlet pipe and, preferably, induce turbulence.

Figure 11:
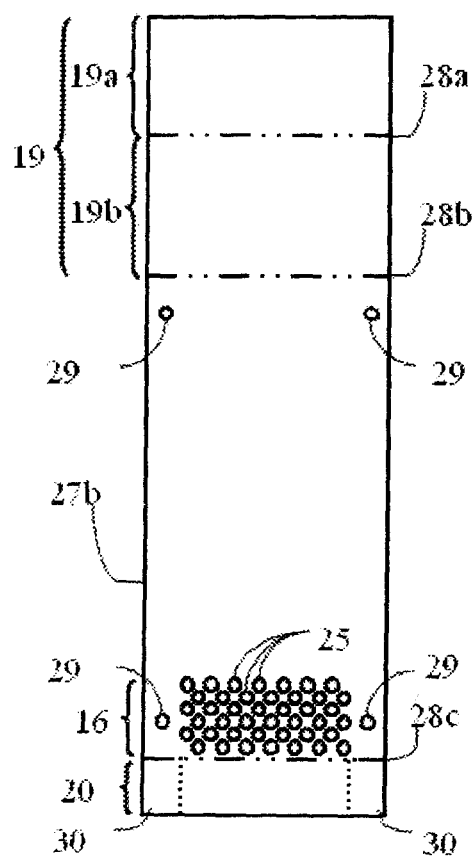
FIG. 11a is a fabrication plan view of a particular prepared plate 27b before bending, to combine several components of the invention in a single fabricated item.
FIG. 11b is a side view of the prepared plate 27b of FIG. 11a after bending, combining several components of the invention in a single fabricated item.
Figure 11:
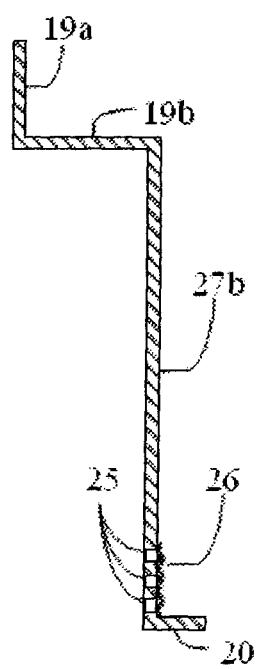

Beyond the inlet region, there are multiple apertures or openings 16 between upper 17 and lower 18 sections of trough 1. There is a vertical baffle 20 in lower section 18 in the vicinity of each opening 16 to re-direct a portion of sulphuric acid flow up through opening 16. Equally sized baffles 20 are conveniently fabricated and installed but, some are scaled to adjust the flow rate through each opening 16 in long distributors. Baffles 20 functions at any elevation between the bottom and separating plate 15 in lower trough section 18. In a most preferred embodiment, baffles 20 are located at the bottom of horizontal partitioning plates 15 so that a deflector 19, partitioning plate 15, and vertical baffle 20 can be fabricated from a single piece of formable material. High silicon austenitic stainless steel is the preferred material in towers for sulphuric acid production and can be formed into plates incorporating several features, as shown in FIG. 11, using bending and cutting machines. Each of baffles 20 also redirects sulphuric acid flow within lower trough section 18, as illustrated by flow arrow 23d. Thus, these baffles 20 also induce turbulence that provides a more uniform liquid flow profile in lower trough section 18. In ductile iron distributors of prior art for sulphuric acid service, this turbulence would quickly corrode the exposed surfaces.

Referring again to FIG. 8, deflectors assemblies 19 are provided at the downstream edge of openings 16. In the absence of deflector assemblies 19, high inlet flow velocities cause flow through one opening 16 to continue in the horizontal direction and add to horizontal liquid flow from the next opening 16. This results in the surface height of the liquid to be higher at the far ends of trough 1 than at the center in a stationary pattern and high upward velocity causes significant local liquid level disturbances. Deflectors 19 provide obstruction across both the horizontal and upward directions of flow, and are located at openings 16 to maintain low average velocity in upper section 17 by directing flows through openings 16 into a horizontal, but reverse direction, 23e, along the bottom surfaces of upper trough section 17. A significant benefit is found in keeping the reverse horizontal liquid flow with an average velocity that is sufficient to maintain a shear force to sweep away settling solids.

FIG. 9, cross-section view CC-CC' of FIG. 5, is a side-to-side cross-section through inlet pipe 14a and distribution trough 1a of recent prior art showing the use of many submerged orifices 12, which are located at a common elevation on horizontal wall sections 24 of trough 1a. This case of recent prior art shows no dividing partition for two trough sections although inlet pipes 14a are shown to extend into lower portion 18a of the trough. The prior art uses a multiplicity of inlet pipes 14a to provide many divided inlet flows 23a into trough for low velocities suitable for ensuring even distribution of liquid discharge flows along the length of distribution trough 1a.

Figure 10:
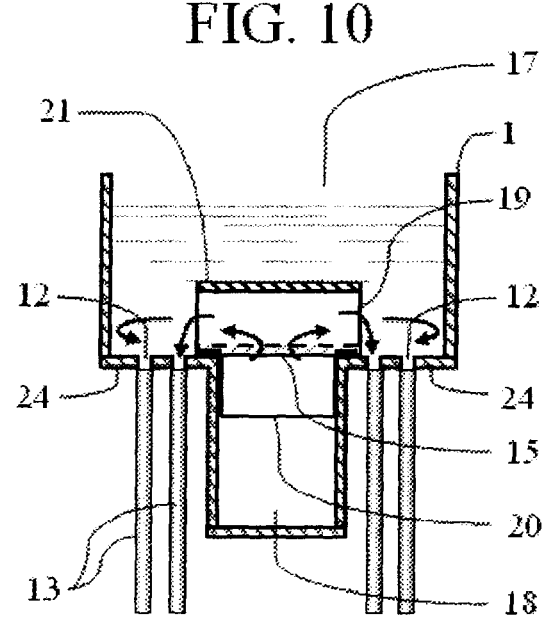
FIG. 10 is a vertical cross-section view C-C', of FIG. 6, according to the invention.

FIG. 10, cross-section view C-C' of FIG. 6, is a side-to-side cross-section of the improved distribution trough 1 through a typical opening 16, (see FIG. 8) showing that deflector 19 spans the entire width of lower section 18 of trough 1 with side overlap above horizontal dividing wall plates 15. Liquid flow up-ward directing baffles 20 are shown located at the top of lower section 18. The cross-section as shown in FIG. 10 shows the use of many submerged orifices 12 located at a common elevation on horizontal side ledges 24 of trough 1. Flow arrows indicate typical flow paths into upper section 17 and into submerged orifices 12, as well as indicating back-eddy currents that maintain suspension of fine particles, and a sweeping action for re-entrainment of settled solids.

In a preferred embodiment, horizontal partitioning plate or plates 15 between lower 18 and upper sections 17 is also used to support screens or similar filtering devices in openings 16 to restrain large solids particles entrained in the inlet flow in lower section 18. The size of screen openings are chosen to pass solids that are small enough to avoid blockage of orifices 12, i.e. less than the orifice size and, preferably, less than one fifth of the orifice size.

FIGS. 11a and 11b illustrate a deflector assembly 19 and baffle 20 formed as parts of a particular plate section 27b of dividing partition plates 15, from a single piece of plate material or sheet metal. Other differently dimensioned and bent plate sections 27a, 27c, and 27d at the inlet of and at the end of a distribution trough 1 are illustrated in FIGS. 12a, 12b, 13a and 13b.

In FIG. 11a, particular plate 27b is cut to a suitable width and a length that includes lengths for horizontal and vertical portions 19a and 19b of deflector 19, a length portion for opening 16, and a length portion for lower section baffle 20. The so-prepared plate is bent along lines 28a, 28b, and 28c to form the profile illustrated in FIG. 11b. FIGS. 11a and 11b illustrate a section of the horizontal plates with perforations 25 that are used for openings 16, and for support of finer screen 26, if necessary. For multiple partition plates 27b between the upper and lower sections, a consistent length of partition plate between opening 16 and deflector 19 is preferred but is varied as necessary, e.g. the distance between the openings may be altered at the trough ends and center. Before bending, particular plate 27b is further prepared with punched, drilled, or cut holes 29 for bolting assembly, having opening perforations 25, and removal of corners 30 for fitting baffle 20 into lower trough section 1.

For clarity, FIGS. 12a, 12b, 13a and 13b do not include down comers that are attached under orifices 12.

Figure 12:
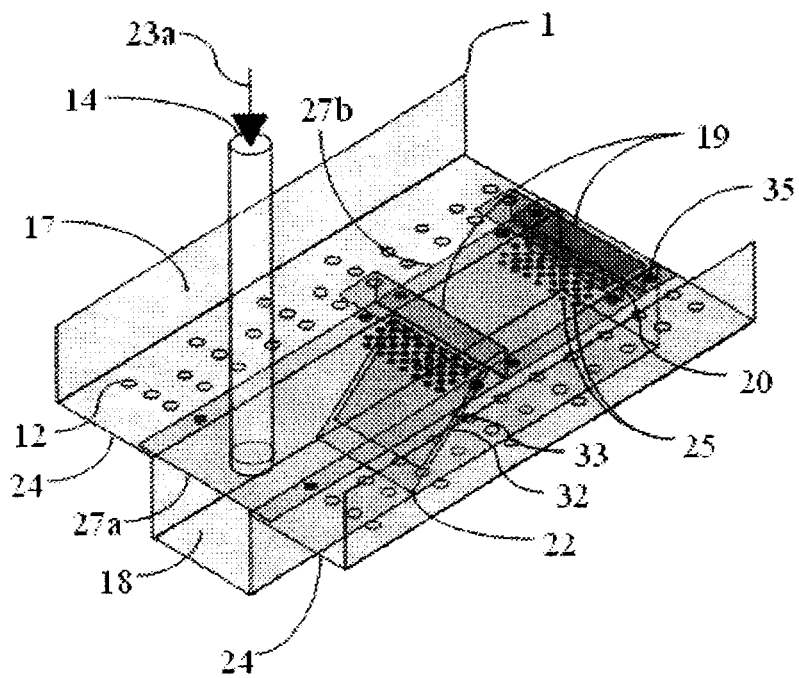
FIGS. 12a and 12b show wire frame isometric illustrations of a portion of a distribution trough of the invention near the liquid inlet of the distribution trough, including an exploded view of the components (FIG. 12b)
Figure 12:
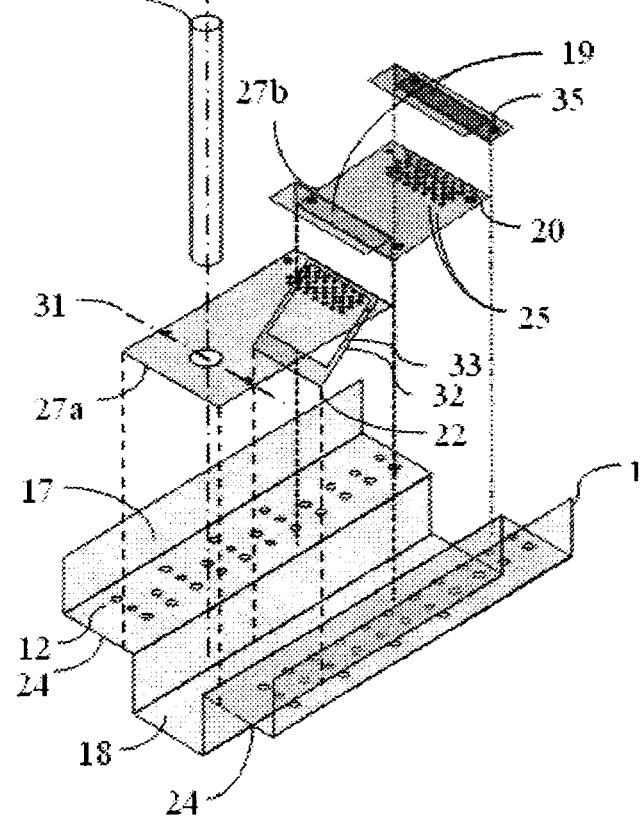

FIG. 12, isometric wire frame assembly and exploded views of an inlet portion of trough 1, shows partition plates 27b, as described above and another particular partitioning plate 27a that is used at central trough inlet 14 supplying inlet liquid flow 23a. Inlet partition plate 27a as shown is truncated but extends similarly in the opposite direction from inlet 14, i.e. symmetrically about centre-line 31. Partition plate 27a includes perforated end sections for the first of apertures 16 on either side of inlet 14. Partition plate 27a also incorporates inlet bottom baffle 22 as the lower part of an extended and bent portion 33 of partition plate 27a, having opening 32 passing liquid through lower section 18 of trough 1. Extended portion 33 with bottom baffle 22 may also be prepared as a separate piece and attached, e.g. welded to partition plate 27a.

Figure 13:
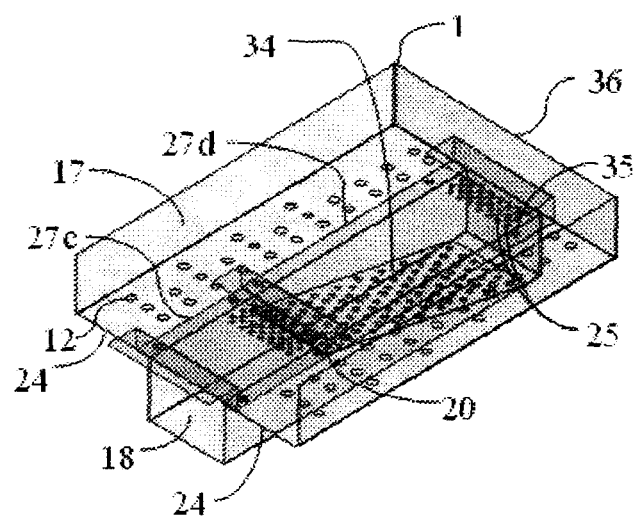
FIGS. 13a and 13b show wire frame isometric illustrations of a portion of a distribution trough of the invention at a distribution trough end, including an exploded view of the components (13b)
Figure 13:
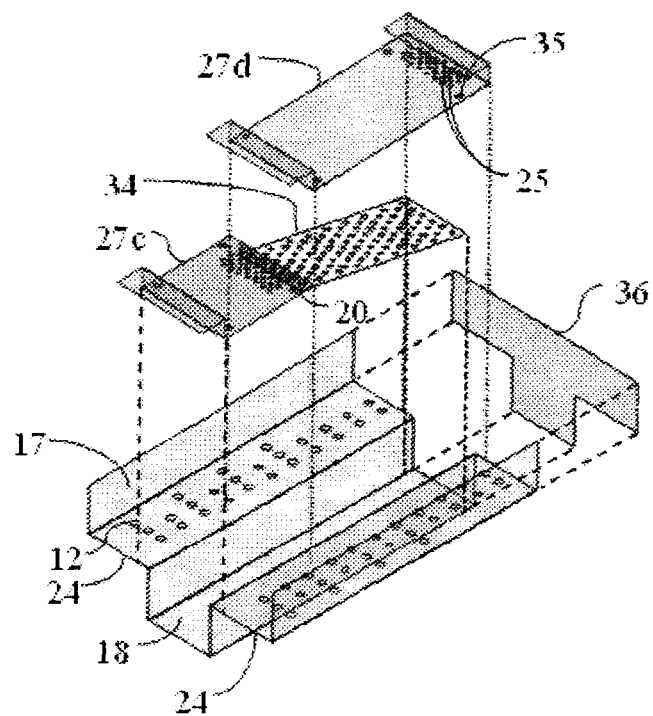

FIGS. 13a and 13b, isometric wire frame assembly and exploded views of an end portion of trough 1, show two particular partition plates 27c and 27d forming the last sections of partitioning plates 15 before an end wall 36 of the trough. At the end regions of each trough 1a perforated plate and/or screen 34 extending from separating plate to the bottom of the lower section 18 of trough 1 is included as a final means to filter and collect sedimentation. A diagonal perforated plate 34 or screen is preferably attached to one of the final separating plates 27c or 27d in trough 1 as shown on the second last plate 27c in FIGS. 13a and 13b, so that plate 27c and diagonal screen 34 can be removed in unison for cleaning of any accumulated sedimentation. The preferred geometry is a general diagonal direction extending downwards from the rear of the penultimate aperture 16 to trough 1 bottom and extends towards the end of trough 1 such that solids are directed into a pocket where they can accumulate without preventing flow through the end openings. These are particularly useful during initial operation after new packing is introduced with some likely breakage creating larger sized solids.

FIGS. 12a, 12b, 13a and 13b also indicate the use of bolts 35 to hold some removable plates in place which is necessary to facilitate solids clean-out. Other plates are permanently fixed in place by welding.

Figure 14:
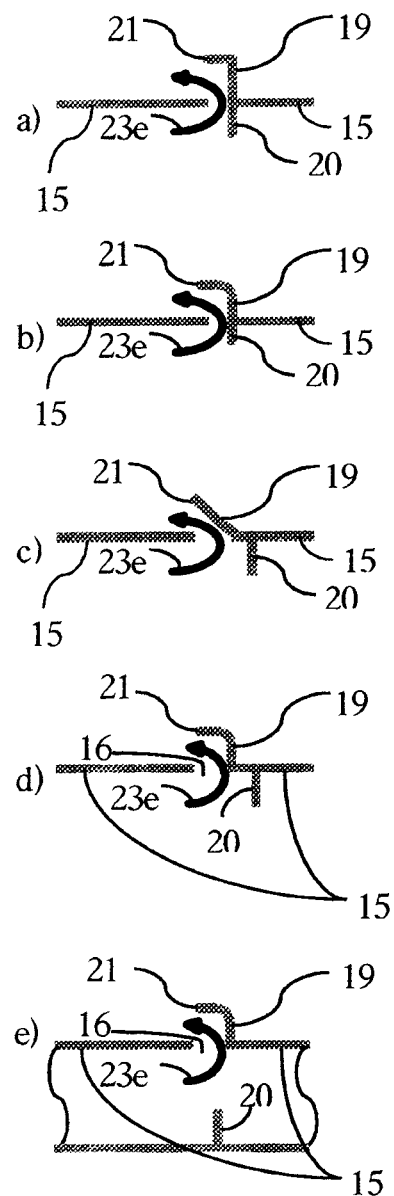
FIG. 14 shows examples of alternate baffle and deflector geometries according to the invention,
and wherein the same numerals denote like parts.

The side shape of deflectors 19 is not limited to the preferred angular form as shown in FIG. 8 and FIG. 14a but may also be, by way of example, of different curvilinear shapes as shown in FIGS. 14b, c, d and e. In FIG. 14b, the leading edge 21 of deflector 19 is shown to overlap an aperture 16 and a portion of partitioning plate 15. FIGS. 14a and 14b show baffle 20 in lower trough section 18 to be aligned with deflector 19, while FIGS. 14c, d and e also show different positions of vertical baffle 20 in lower trough section 18. Various geometries may be contemplated for the baffles and deflectors of use in the practise of the invention in accordance with the foregoing principles to allow for convenient fabrication and installation.

Example

The successful functioning of the present invention was discovered from experimental testing conducted using a small scale distributor trough. The small scale model was made of clear material to allow observation of liquid flow within trough 1 and to determine the overall performance of the distributor improvements compared to an equivalently sized model according to the prior art. The effects of individual features used in improved distributor 1 were also observed by inserting and removing various components. Test work was used to adjust computer simulation models for accurate reproduction and computer simulation gave further insight into the flow patterns and effects of experimentally added features.

Each added feature used in the improved distributor 2 was insufficient on its own per se to improve the overall performance of distributor 1. Thus, starting from an empty trough shell, each feature addressed a performance difficulty but often created a new one. The complete assembly of the improved distributor, according to the invention, was able to address all difficulties encountered.

The following description provides the effects of each feature as visually observed and further depicted in computer simulations.

The number and diameter of inlet pipes into the distribution trough determined the inlet velocity for any given flow rate.

In an empty trough 1, without any additional features, the use of multiple inlets achieved a calm liquid surface with a near uniform distribution. Problems with the introduction of the liquid to trough 1 at a low velocity included settling of suspended solids and calmness of the liquid surface. These were significantly affected in an inverse relation to each other by changes in inlet velocity. Furthermore, the cost of adding more inlets to each trough 1 is expensive and additional conduits made periodic cleaning more complicated and time-consuming, and, thus, thereby contribute to lost production and profit. However, just reducing the number of inlets, which increased inlet velocity, caused a detrimental effect on liquid surface calmness, height and liquid distribution.

In physical testing, and subsequent computer simulation, the number of inlets to the distribution trough model was reduced from ten to one. As the number of inlets was reduced to one, a flow pattern developed which formed a standing wave near the inlet. This leads to a very non-uniform liquid surface height and distinct liquid level difference before and after the standing wave.

A prior art feature comprising a partitioning plate having regularly spaced apertures to create an enclosed bottom section in fluid communication with an open upper section was installed and tested. At high liquid flow throughput, with the inlet liquid flow introduced into the bottom section, the standing wave flow pattern near the central feed inlet did not reappear. There was no distinct jump in liquid surface height as was observed in trials with no partition. However, flow rates through the partition apertures at the ends of the trough were substantially higher than the flow rates through the apertures closer to the central inlet. A stationary pattern of variable liquid height in the upper trough section was observed with the highest liquid levels at the outer ends of the trough, decreasing to the lowest level in the center. Subsequent computer simulations to model fluid flow in the trough with, and without, a partition were adjusted to reproduce the visually observed liquid surface patterns. With a partitioned trough, results of the adjusted model indicated the presence of a strong preferential current at the bottom of the lower trough section.

The variable liquid surface height in the trough prevents the equal discharge flow rates through submerged orifices having equally sized opening diameter and other means to achieve equal discharge flows are impractical. Such means include adjusting orifice diameters for the different liquid surface heights but this would greatly limit the range of operating capacity.

Baffles were introduced into the bottom section of the partitioned trough to balance flows through the apertures in the partitioning plate. Baffles were located both in the vicinity of each aperture and in the entrance region of the trough on the floor opposing the inlet flow. The baffles could be adjusted in position and size to achieve a reasonable balance of flows through the apertures.

The two locations of baffles addressed different issues. Baffles on the trough floor near the inlet disrupted the initial preferential flow along the bottom by inducing turbulence and redistributing the flow currents throughout the lower section of the trough. In the absence of the inlet bottom baffles the performance of the trough remained very similar to a trough with no baffles, i.e. high outer end liquid heights. A singular bottom baffle on each side of the entrance region was insufficient to properly distribute the flow through each aperture along the length of the trough, and an additional baffle in the vicinity of each aperture was found to be necessary. These additional baffles re-direct a portion of the flow from the lower section of the trough into the upper section, but in order for the additional baffles to function properly, it was necessary to first have even flow current across the lower trough cross-section, which was caused by the inlet baffles. However, as subsequently seen in computer simulation, the additional baffles also contributed to inducing turbulence and redistributing and maintaining even flow currents in the lower section along the trough length. Although the computer simulation showed an even liquid flow through the apertures, there was still a visually observed pattern of large liquid height differences between the outer ends and the center of the partitioned trough.

Flow entering the upper section was still primarily horizontal towards the ends of the trough. Introducing vertical deflectors at the downstream side of each aperture on top of the partitioning plate, was found to direct flow primarily upwards, further improving liquid distribution along the length of the trough. However, the vertical flows also caused standing waves to form above each opening. This allowed for the possibility of splashing and also for localized uneven discharge flows due to the surface waves.

Horizontal deflectors were placed over each aperture in conjunction with the vertical deflectors and the combined deflector assemblies were able to prevent standing waves above the apertures. In further testing, the addition of the deflector assemblies was found to minimize the previously found requirements for adjusting positions and sizes of baffles in the lower trough section. Mostly equal spacing and baffle sizes were now sufficient for achieving a remarkably calm and even height of liquid surface along the length of the trough at much higher flow capacity then used in previous trough designs. Further computer simulation, using adjusted model parameters for reproducing the visual results, indicated that the deflector assemblies in the upper section also redirected liquid to sweep over the bottom of the upper trough. The liquid velocity was generally maintained above solid settling velocity and the average shear stress across the bottom was able to either sweep settled particles out through the discharge orifices or cause re-entrainment.

In conclusion, it was seen that the combined effect of the baffles and deflector assemblies clearly provided an improved distribution trough with a reduced number of inlets, a uniform distribution along the length of the trough, a calm liquid surface, and reduced settling of solids when compared to the prior art.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

The invention claimed is:

1. A liquid distribution trough for distributing liquid contained within a tower for the purpose of mass or thermal exchange between at least a first liquid and a second fluid; said liquid distribution trough comprising:
   an upper section and a lower section; said lower section for receiving said first liquid;
   a horizontal dividing member separating said upper section from said lower section and having at least one dividing member portion defining a dividing member aperture or apertures to allow for passage of said first liquid from said lower section to said upper section;
   a feed conduit in communication with said lower section to provide a first liquid flow of said first liquid to said lower section;
   said lower section having at least one inlet portion defining a liquid inlet in communication with said feed conduit;
   a first baffle adjacent said inlet portion, and located on a floor of said liquid distribution trough, opposing said first liquid flow, wherein said first baffle is operably impacted by said first liquid flow;
   a set of at least one second baffle within said lower section and adjacent to at least one of said dividing member apertures to direct a portion of said first liquid flow through said dividing member apertures into said upper section of said liquid distribution trough; and
   a plurality of deflectors within said upper section, each of said plurality of deflectors located adjacent a dividing member aperture and having a portion defining a vertical surface and a portion defining a horizontal surface overlapping said adjacent dividing member aperture to effect a reverse essentially horizontal uniform distribution of flow of said first liquid over the lower surface of said upper section of said liquid distribution trough.

2. A liquid distribution trough as defined in claim 1 wherein said feed conduit comprises a central feed conduit which is a pipe.

3. A liquid distribution trough as defined in claim 1 further comprising said upper section having portions defining discharge exits selected from weir-type or submerged orifice type by which said first liquid exits said upper section of said liquid distribution trough.

4. A liquid distribution trough as defined in claim 3 wherein said discharge exits are submerged orifice type located on said upper section at a common elevation.

5. A liquid distribution trough as defined in claim 3 wherein said discharge exits communicate with downcomers which direct first liquid flow.

6. A liquid distribution trough as defined in claim 1 wherein said first baffle is also so located ahead of said one aperture as to operably induce turbulence that provides more uniform velocity throughout the cross-section of the lower section and maintain suspension of most entrained solids.

7. A liquid distribution trough as defined in claim 1 wherein said set of at least one second baffle is also so located as to induce turbulence along the length of the liquid distribution trough that provides more uniform velocity throughout the cross-section of the lower section and maintain suspension of most entrained solids.

8. A liquid distribution trough as defined in claim 1 wherein each of said plurality of deflectors is of a shape having vertical and horizontal faces selected from planar and curvilinear faces, and wherein said vertical face is perpendicular to a longitudinal axis of the liquid distribution trough along which said first liquid flows and said horizontal face is perpendicular to a vertical axis of the liquid distribution trough.

9. A liquid distribution trough as defined in claim 8 wherein each of said plurality of deflectors has angular or curvilinear shaped side-extensions to the faces perpendicular to the longitudinal axis of the liquid distribution trough, which extend at least partly to side walls of the upper section.

10. A liquid distribution trough as defined in claim 1 wherein said horizontal dividing member comprises a unitary plate having said apertures, or is a plurality of plates providing said apertures between adjacent plates.

11. A liquid distribution trough as defined in claim 1 wherein each of said set of at least one second baffle is aligned adjacent to a downstream back edge of the apertures in said horizontal dividing member, or wherein said set of at least one second baffle is attached to a lower portion of said plurality of deflectors, and wherein said lower portion extends through said apertures into said lower section.

12. A liquid distribution trough as defined in claim 1 wherein,
said horizontal dividing member is a plurality of plates providing said apertures between adjacent plates,
wherein said set of at least one second baffle and said deflectors are integrally formed portions of said plates.

13. A liquid distribution trough as defined in claim 1 further comprising screens to retain particles larger than the size of said discharge exits, in said lower section, adjacent said dividing member aperture or apertures.

14. A liquid distribution trough as defined in claim 1 wherein said feed conduit comprises an at least one downcomer for each liquid entrance to said liquid distribution trough.

15. A tower for use for mass and/or heat transfer wherein said tower comprises one or more sections adapted to receive packing and also incorporates a liquid distribution trough as claimed in claim 1, or a network of said liquid distribution troughs.

16. A tower as claimed in claim 15, wherein said tower is constructed and arranged to be used as an absorption tower and/or as a drying tower in a sulphuric acid contact process, or to be used as an absorption tower in a carbon dioxide capture process.

17. A sulphuric acid plant, which plant comprises an absorption tower or a drying tower, and wherein said absorption tower or said drying tower has a liquid distribution trough as claimed in claim 1, or has a network of liquid distribution troughs as claimed in claim 1.

18. A carbon dioxide capture plant, which plant comprises an absorption tower, wherein said absorption tower has a liquid distribution trough as claimed in claim 1, or a network of liquid distribution troughs as claimed in claim 1.

* * * * *